Sept. 19, 1950 N. D. PRESTON 2,522,892

CODED TRACK CIRCUIT SIGNALING SYSTEM FOR RAILROADS

Filed June 8, 1946 5 Sheets-Sheet 1

INVENTOR.

Neil D. Preston

CODED TRACK CIRCUIT SIGNALING SYSTEM FOR RAILROADS

Filed June 8, 1946 5 Sheets-Sheet 2

INVENTOR.
Neil D. Preston,

INVENTOR.

Neil D. Preston

Sept. 19, 1950 N. D. PRESTON 2,522,892

CODED TRACK CIRCUIT SIGNALING SYSTEM FOR RAILROADS

Filed June 8, 1946 5 Sheets-Sheet 4

INVENTOR.
Neil D. Preston

Sept. 19, 1950    N. D. PRESTON    2,522,892

CODED TRACK CIRCUIT SIGNALING SYSTEM FOR RAILROADS

Filed June 8, 1946    5 Sheets-Sheet 5

INVENTOR.

Neil D. Preston

Patented Sept. 19, 1950

2,522,892

UNITED STATES PATENT OFFICE 2,522,892

CODED TRACK CIRCUIT SIGNALING SYSTEM FOR RAILROADS

Neil D. Preston, Rochester, N. Y., assignor to General Railway Signal Company, Rochester, N. Y.

Application June 8, 1946, Serial No. 675,347

11 Claims. (Cl. 246—38)

Figure 1A:
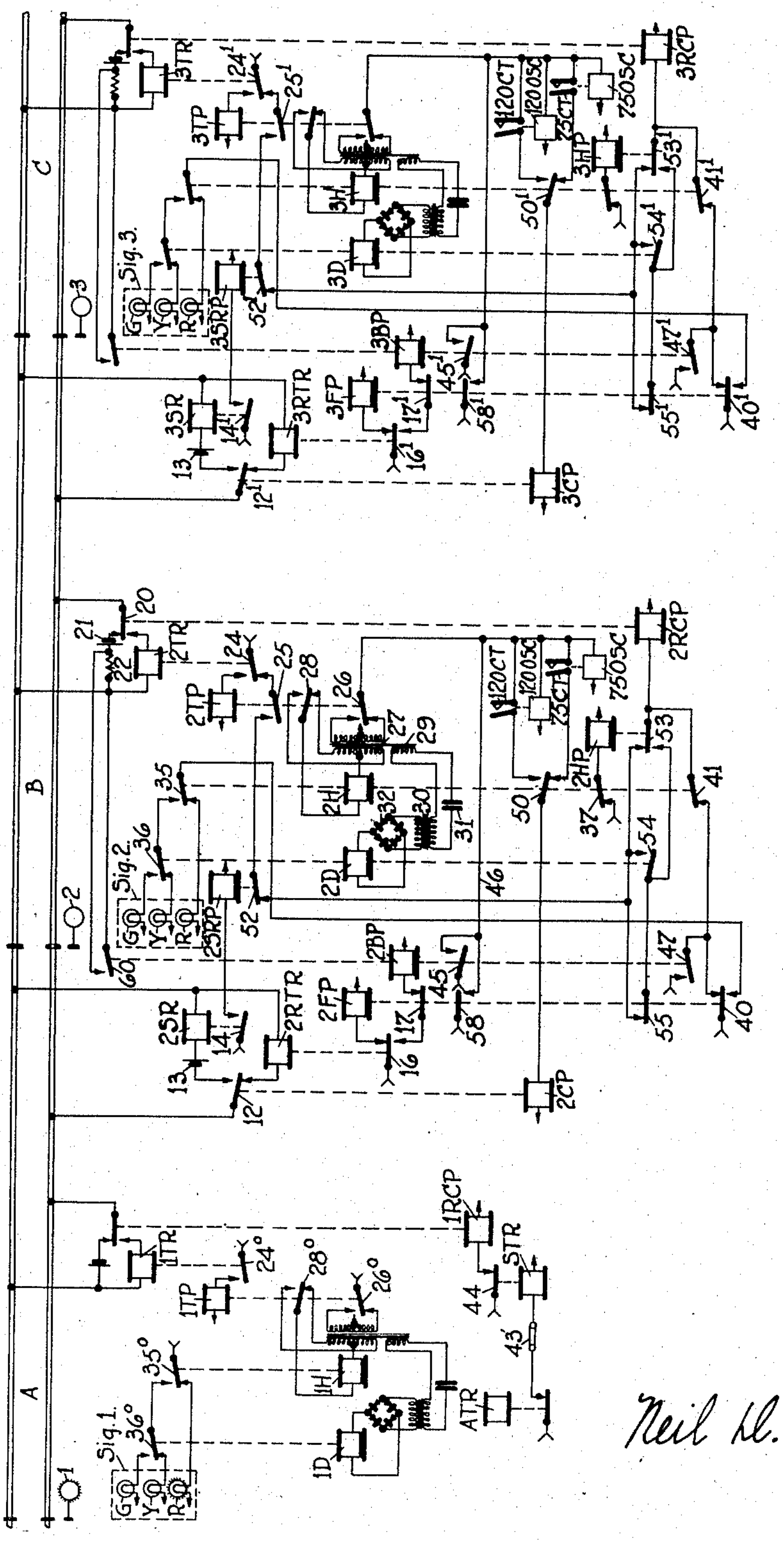

This invention relates to automatic block signalling systems for multiple track railroads using coded track circuits, and more particularly to such a system in which the coded track circuits are normally inactive and steadily energized, and are automatically set into coding operation and restored to the normal condition by the movement of trains.

In the usual type of coded track circuit automatic block signalling system for double track railroads, the various coded track circuits of the several blocks are constantly in a coding operation whether or not any train is present. The primary purpose of track circuits for governing the indications of block signals, however, as distinctive from track circuits for detecting train presence in interlocking plants, approach to highway crossings, and the like, is to govern the indications of the wayside block signals or provide control for the cab signalling equipment for trains; and if there is no train approaching a given coded track circuit within a limited distance, the continuous coding operation of this track circuit represents an unnecessary operation of the contacts and moving parts of the coding apparatus, tending to limit its useful life.

It can be readily appreciated that coding operation of the track circuits in a block signal system is required for governing the movement of trains only a very small part of the total time, and that there would be a substantial saving in the wear and tear upon the coding apparatus, and a prolongation of its useful life, if the coded track circuits were normally inactive and set into coding operation only when required to govern signal indications for the movement of trains. The objectionable wear and deterioration of constantly operating coding equipment, limiting its useful life, is particularly true of the contacts of the code transmitter relays which are often required to make and break relatively large currents for long track circuits and low ballast. Also, if the coded track circuits of an automatic block signal system are normally inactive and automatically started by approaching trains, there is an advantageous saving in the energy that would otherwise be required for the decoding transformers, code oscillators, signal control relays, and the like, if the track circuit were in continuous operation, such saving of energy being particularly useful where primary batteries are used.

With these considerations in mind, it is proposed in accordance with this invention to provide a coded track circuit block signalling system suitable for multiple track railroads, in which the coded track circuits for long stretches of track are normally inactive and non-operating, but steadily energized from the entrance end, and are automatically set into operation by the approach of a train for the appropriate number of blocks ahead of said train, and are automatically restored to their normal inactive condition behind such train.

The primary object of this invention is to provide a system in which these desired functions of automatic starting and shut-down of coded track circuits for stretches of track on multiple track railroads are performed by conventional apparatus and circuits in a simple and effective manner, and without the complication of much additional apparatus than otherwise required for a constantly operating coded track circuit system.

Various other objects, characteristic features and advantages of the invention will be in part apparent and in part pointed out as the description progresses.

This invention is in the nature of a simplification and improvement in the type of system disclosed in the prior application of W. H. Reichard. Ser. No. 567,995, filed December 13, 1944, now U. S. Patent No. 2,488,683, and my prior application Ser. No. 659,682, filed April 5, 1946, now U. S. Patent No. 2,519,979.

Generally speaking, and without attempting to define the exact nature and scope of the invention, the contemplated organization comprises code transmitting means and code receiving means for each end of each block, operable to provide the usual signal control driven codes of a code rate selected in accordance with traffic conditions, and at times the usual form of inverse code pulses during the "off" intervals of the driven code being received. This conventional coding equipment for the track circuits is supplemented by certain relays and control circuits to provide a steady energization of each track circuit from its entrance end under normal conditions when no train is approaching within certain limits, and also to provide a control for automatically starting coding operation in a predetermined number of blocks ahead of a block occupied by a train. This automatic approach starting involves a tumble-down control of the usual inverse code of a fixed polarity and a particular sequence of relay operation so timed that the tumble-down control is arrested or discontinued when coding operation has been initiated in a sufficient number of blocks to provide the highest code rate in the block ahead of the train, if traffic conditions otherwise permit. The system is also so organized that the track circuits assume their normal inactive and steadily energized condition behind a train as it moves through the equipped stretch of track. Further features and operating characteristics of the organization constituting this invention will be explained as the description progresses.

In describing in detail the structure and mode of operation of certain particular embodiments of the invention, reference is conveniently made to the accompanying drawings, in which the parts and circuits of the proposed system have been illustrated diagrammatically and conventionally, more with the view of facilitating an explanation and understanding of the fundamental functions and operating characteristics of the invention, than for the purpose of illustrating the detailed structures and arrangements of parts that would be preferably employed in practice. Also, these drawings include for explanatory purposes certain diagrams or charts illustrating in a schematic manner the condition of track circuits, indications of signals, and sequence of relay operation for certain typical train movements.

In order to simplify the illustration and circuits in these drawings, the connections to the opposite terminals of a battery or other suitable source of current for energizing the local relay circuits have been represented by the symbols (+) and (−) associated with arrows suggesting the flow of current into and out of the electrical connections shown. Also, the relays and their contacts have been illustrated in a simplified and diagrammatic manner, in which the contacts are located either above or below the representation of the coil or winding of a relay as most convenient for showing circuit connections, and the contact fingers for a relay, shown as associated with its coil by dash lines, are moved from an inclined position to a horizontal position when the relay is energized.

Figure 1B:
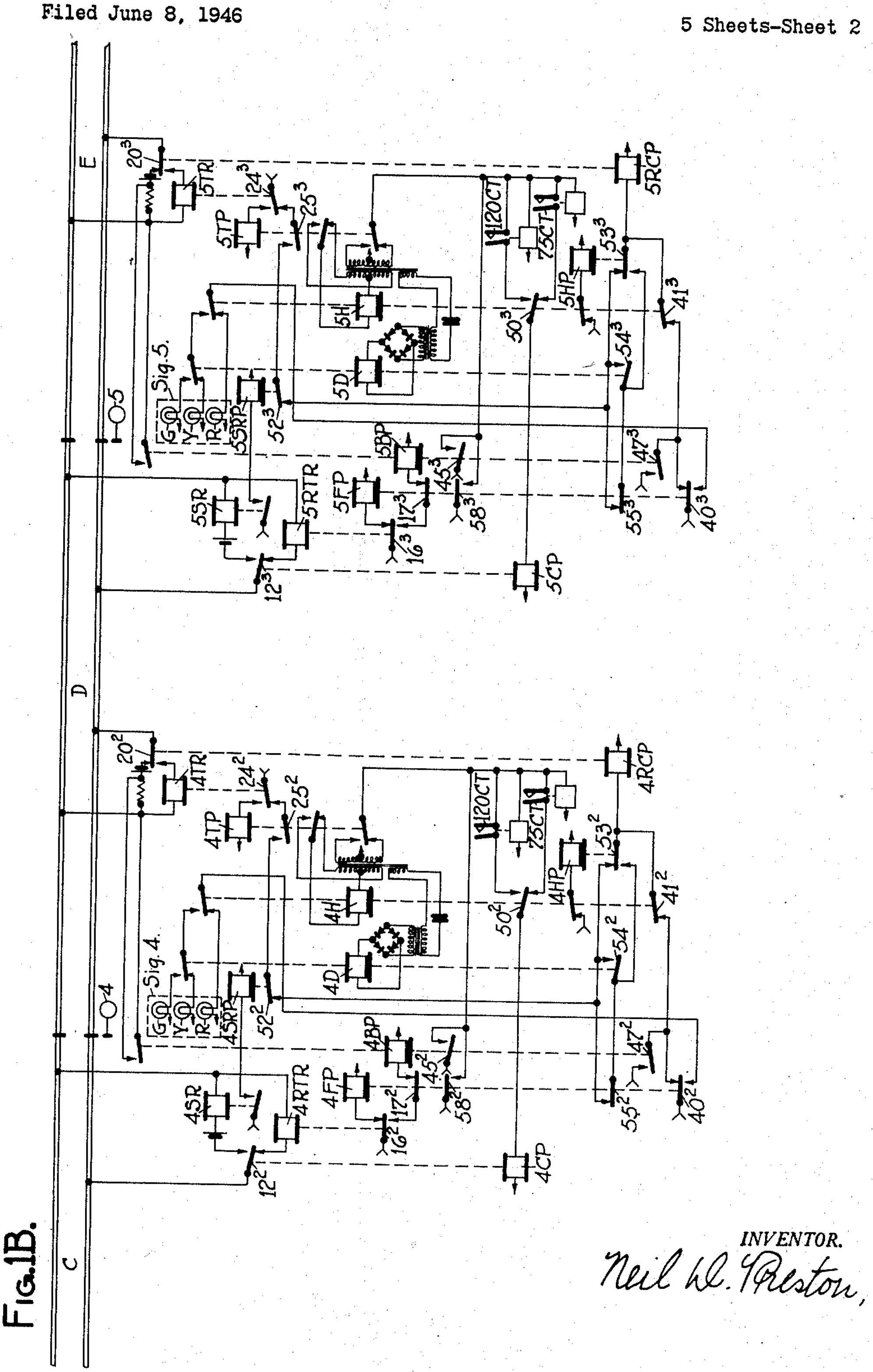

In the accompanying drawings, Figs. 1A and 1B, when arranged end to end, illustrate the system of this invention applied to a series for blocks assumed to be adjacent the entrance point to the equipped stretch.

Figs. 2A to 2G inclusive are explanatory charts or diagrams for illustrating conventionally the condition of track circuits, signal indications, and sequence of relay operation for certain train positions and movements constituting typical operations of the entire system.

Figure 3:
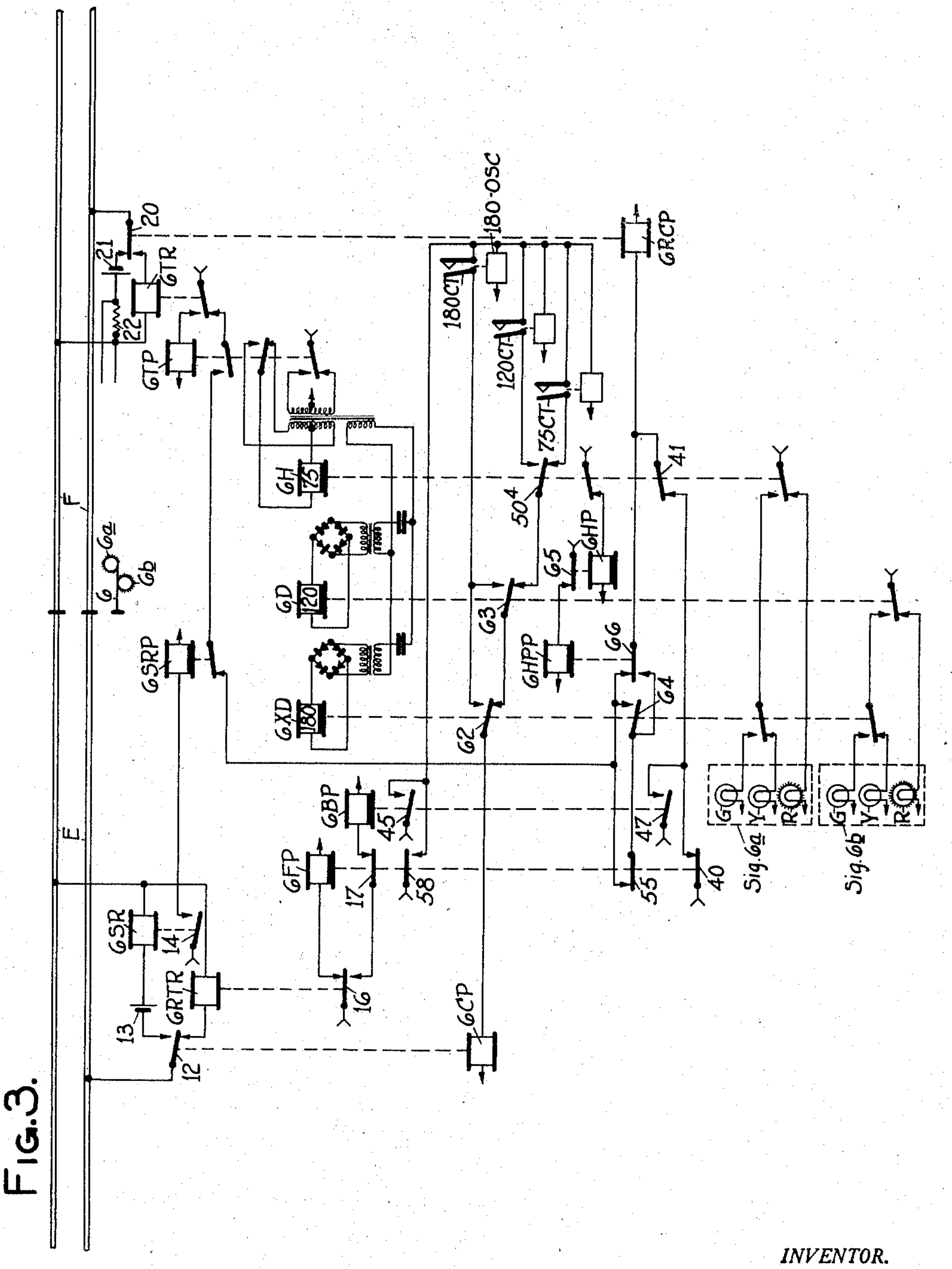

Fig. 3 illustrates for one typical signal location an adaptation or modification of the system as shown in Figs. 1A and 1B for providing a larger number of signal indications suitable for multiple block indications used on some railroads.

The system of this invention is designed for automatically starting and stopping coding operation of normally inactive and steadily energized coded track circuits of an automatic block signal system for multiple track railroads, or like stretches of track signalled for train movement in one direction only, where there is no supervisory manual control available for governing the operation of the coded track circuits in connection with establishing a direction of traffic. It is contemplated that the stretches of track equipped in accordance with this invenion will be those between interlocking plants, highway crossings, power operated outlying switches, and similar locations where a conventional track circuit or a constantly operating coded track circuit is required for detection of train presence. Such a stretch of track in block signal territory, to which this invention may be advantageously applied, is assumed to be divided into a series of consecutive blocks of the appropriate length for the type of traffic and signal indications employed, in accordance with the usual practice. For the specific organization shown, it is assumed that each of these blocks includes only one coded track circuit; but it should be understood that the invention may be applied where cut sections are used in a block by providing suitable and well known expedients for relaying or repeating driven and inverse code past the insulated joints at such cut sections.

It is also assumed that each block of the equipped stretch is provided with a suitable wayside signal at the entrance end, capable of displaying the different desired signal indications under the control of decoding apparatus responsive to the different code rates transmitted, in the usual and well-known manner. In this connection, it should be understood that the system of this invention provides ahead of the trains a rail current coded in accordance with traffic conditions ahead, so that the trains may be equipped with cab signal or automatic train control equipment in the usual manner, if desired, and train movement governed by such train carried equipment, with or without the wayside signals. The wayside signals may be of any suitable type of semaphore or color light signal. In the simplified arrangements shown, it is assumed that a signal has a plurality of electric lamps and associated colored lenses adapted to display the desired color light indications when these lamps are lighted by the circuits shown; but the same home and distant relays H and D illustrated may be employed to control signals of other types by well known signal control circuits.

The system in general comprises a duplication of the same apparatus and circuits at the various signal locations in the equipped territory, except that certain parts and circuits are not required for the signal location at the entrance point to the equipped stretch; and an explanation of the apparatus for the typical signal location 2 shown in Fig. 1A will serve for all. In view of this duplication of apparatus for the different signal locations, it is convenient to use the same letters for designating the relays associated with these signal locations with a prefix number corresponding with the associated signal, and also employ the same reference numbers for the relay contacts and wiring connections for signal locations 3, 4, etc., as those used for the signal location 2 with distinctive exponents.

The apparatus for the typical signal location 2 comprises a driven code transmitter relay 2CP for the block A in the rear, which is arranged to be intermittently energized at a selected code rate, such as 75 or 120 code pulses per minute, by the intermittent operation of coding contacts 75CT and 120CT shown diagrammatically and operated by code oscillators 75OSC and 120OSC of the usual type, such as disclosed, for example, in the patent to O. S. Field, No. 2,351,588, June 20, 1944. The transmitter relay 2CP, when deenergized as shown, connects through its back contact 12 an inverse code responsive relay 2RTR across the track rails of the block A; and when this transmitter relay 2CP is energized, it connects through its front contact 12 a track battery 13, or equivalent source of current, across the track rails in series with a series relay 2SR of the usual type. This series relay 2SR is constructed and adjusted in accordance with usual practice, so that it is energized each time the transmitter relay 2CP is energized, if there is a train in the block A near enough to the exit end to cause pick-up current to flow through a winding of this series relay 2SR. In the system of this invention, it is sufficient if the series relay 2SR is energized for a short time before the train passes the signal 2, sufficiently long to start coding in an additional block ahead, as will later appear; and hence the operating limits for the series relay 2SR are not critical, and this relay may be of any suitable type responding to the presence of a train some 2000 feet or so from the signal.

The intermittent energization of the series relay 2SR in response to the presence of a train, and the intermittent closure of its front contact 14 maintains energized a slow release repeater relay 2SRP by an obvious circuit.

The track relay 2RTR, normally energized as shown, and also intermittently energized at times by an inverse code under conditions later described, establishes through its front contact 16 an obvious circuit for energizing a slow release front contact repeater relay 2FP, which is sufficiently slow releasing to maintain its armature and contact fingers in the attracted position when the track relay 2RTR is intermittently energized by inverse code pulses at the lowest code rate. The track relay 2RTR establishes through its back contact 16 an energizing circuit, readily traced on the drawings and including a front contact 17 of the relay 2FP, for energizing another slow releasing back contact repeater relay 2BP, which is likewise maintained energized when the track relay 2RTR is operated by inverse code. Since the energizing circuit for the back contact repeater relay 2BP includes a front contact 17 of the front contact repeater relay 2FP, both of these relays are ultimately deenergized if the track relay 2RTR remains deenergized.

Considering now the apparatus associated with the entrance end of the block B at the typical signal location 2, an inverse code transmitter relay 2RCP, which is normally energized by circuits more conveniently discussed later in describing the operation, acts when energized to close its front contact 20 to connect a track battery 21 in series with a suitable regulating resistance 22 across the track rails at the entrance end of the block. When this inverse code transmitter relay 2RCP is intermittently operated by an inverse code operating circuit, as later described, the track battery 21 is intermittently connected across the track rails to provide inverse code pulses.

The code following track relay 2TR for the entrance end of the block B is connected across the track rails by obvious circuit connections through the back contact 20 of the transmitter relay 2RCP when this relay is deenergized. The intermittent energization of the code following track relay 2TR by driven code pulses from the exit end of the block B intermittently closes its front contact 24 to energize a quick acting repeater relay 2TP; and the back contact 24 of the track relay 2TR and a front contact 25 of the repeater relay 2TP cooperate to provide an inverse code pulse, when an inverse code operating circuit is closed, upon release of the track relay 2TR and until its repeater relay 2TP releases. Any other suitable and well known means for providing inverse code pulses may be employed; and the particular arrangement illustrated is merely typical.

The coding operation of the code following track relay 2TR and its repeater relay 2TP govern the indications of the associated signal 2 by a suitable code responsive and decoding means. In the particular arrangement illustrated, the repeater relay 2TP governs through its front and back contacts 26 the energization of the two halves of the primary of a decoding transformer 27, having the usual mid-tap connection; and the two halves of a secondary of this transformer 27 are connected through front and back rectifying contacts 28 of the relay 2TP to a slow releasing home relay 2H, so that this relay 2H is energized by the reception of any code rate, but releases when the contacts of the repeater relay 2TP stop operating. Another secondary 29 of this decoding transformer 27 is connected to the primary of a coupling transformer 30 by a circuit tuned by a condenser 31 to resonance at the clear code rate, such as 120 pulses per minute as shown; and the secondary of this coupling transformer 30 is connected by a full-wave rectifier 32 of the usual type to a slow release distant relay 2D. When the 120 clear code is received, the distant relay 2D, as well as the home relay 2H, is energized.

The home and distant relays 2H and 2D control the indications of the associated signal 2 by any one of the well known signal control circuits, dependent upon the type of signal. As shown, the green, yellow and red lights of the signal have lighting circuits governed by front and back contacts 35, 36 of the relays 2H and 2D, in a manner readily understood without detailed explanation, so that in the absence of any driven coding in the block B, the red light is lighted, the energization of the home relay 2H lights the yellow light, and the energization of both the home and distant relays 2H and 2D lights the green light.

The apparatus at the typical signal location 2 also includes a timing or slow release relay 2HP, normally energized by an obvious circuit through a back contact 37 of the home relay 2H. The purpose of this slow release repeater relay 2HP, and the significance of its release time, is more conveniently considered later in discussing the operation.

The various relays at a typical signal location, although illustrated conventionally as a matter of convenience as being of the ordinary neutral type, are assumed to be of such structure as best adapted for their particular purpose, in accordance with recognized practice for coded track circuits. For example, it is contemplated that the code following track relay 2TR will be a low resistance biased polar relay, so that broken-down joint protection may be obtained by staggering the polarity of energization of the track rails on opposite sides of the insulated joints. Similarly, other relays may be of the biased polar type, in accordance with regular practice. Various relays, such as 2SRP, 2FP, 2BP and the like, illustrated conveniently as being slow releasing, are assumed to be provided with proper slugs, short-circuited windings, rectifiers, or some other well known expedient to obtain the desired slow releasing characteristics. These slow releasing relays are expected to operate their armatures upon energization as quickly as the slow releasing means will permit.

*Operation*

In describing the contemplated mode of operation of the system of this invention, it is expedient to consider the operation of the different embodiments of the invention for certain typical operating conditions separately, bearing in mind that these typical operations described occur at different times and under different conditions for the system as a whole in the practical operation of trains in the equipped territory. For example, it is convenient to consider as a separate operating condition the relays and circuits involved in automatically starting coding operation for the appropriate number of blocks ahead of an entrance point in the system, and then discuss separately the extension of starting control as the train moves through the stretch, restoration to normal behind a train, and similar conditions of train movement illustrative of the operation of the system as a whole.

As previously indicated, the coded track circuits in the equipped stretch are steadily energized from the entrance and under normal inactive conditions existing while no train is approaching a given track circuit within a limited approach controlling distance. This is accomplished by maintaining energized the inverse code transmitter relay at the entrance end to each block by a circuit, which in the case of the transmitter relay 2RCP for the typical signal location 2 in Fig. 1A, may be readily traced from (+), through front contact 40 of the repeater relay 2FP for the block A in the rear, back contact 41 of the home relay 2H, and winding of relay 2RCP, to (—).

*Starting at an entrance point.*—Although the entrance of a train into any block will deenergize the steadily energized coded track circuit of that block and automatically initiate coding operation in blocks ahead, it is considered desirable to provide special facilities at interlocking plants, or like entrance points, to the equipped stretch to initiate coding operation and clear the first signal at such entrance point, so as to avoid train delay. In connection with the entrance of a train into the equipped stretch at an interlocking plant, outlying switch, or the like, the train will occupy some track circuit or circuits in approaching the first signal in the equipped stretch, or there will be some manual actuation of a lever, switch, or the like; and either or both of these conditions may be employed to initiate coding operation of the appropriate number of blocks of the stretch prior to the time the train reaches the first automatic block signal of the stretch.

Referring to Fig. 1A, and assuming some such circuit controller, indicated conventionally at 43, or a track relay ATR for an approach section of track, it is contemplated that a start relay STR will be deenergized when the automatic approach starting control should occur to clear the first automatic block signal 1 of the stretch, if traffic conditions otherwise permit. The release of the start relay STR and opening of its front contact 44 interrupts the obvious circuit then maintaining energized the transmitter relay 1RCP for the entrance end of the block A, thereby deenergizing the normally energized track relay 2RTR at the exit end of this block A.

Figures 2A, 2B, 2C:
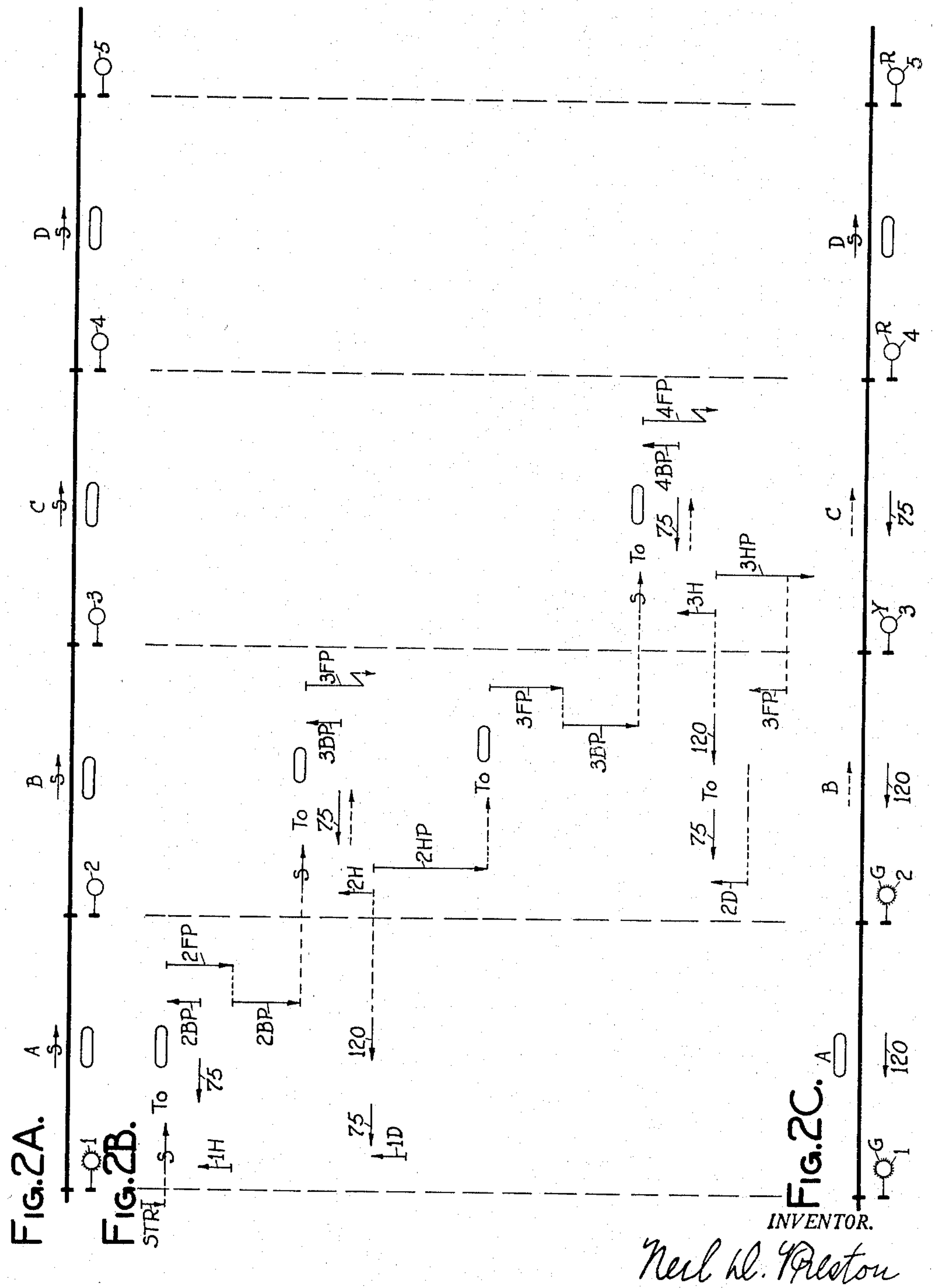

The removal of the steady energization of the track rails in block A from the entrance end initiates a sequence of relay operation, which is conventionally and diagrammatically represented in the sequence diagram of Fig. 2B. This sequence diagram is not intended to indicate operation of all relays, such as track relays, transmitter relays, but only those relays more directly involved in the approach starting operation of the system. Also, it is not intended to indicate the exact operating times for the relays, but merely indicate for explanatory purposes the general relative timing and sequence of the relay operations. Certain symbols are employed in these diagrams for representing driven code, inverse code and energization and release of relays, which will be readily understood as this diagram is considered in connection with the explanation of the operation.

The release of the start relay STR changes the steady energization of the block A symbolically indicated in Fig. 2A, to a zero or deenergized condition, also symbolically represented. The resultant release of the track relay 2RTR at the exit and of block A and closure of its back contact 16 energizes at once the relay 2BP, which closes its front contact 45 to supply energy over wire 46 to the oscillators 75OSC, 120OSC and coding contacts 75CT, 120CT, and also the contact 26 of the track relay 2TP energizing the decoding transformer 27. At the same time the relay 2BP also closes a front contact 47 to supply current in multiple with the front contact 40 of the relay 2FP to maintain energized the inverse code transmitter relay 2RCP for the next block B in advance, thereby providing a steady energization for this block B until the relay 2BP, as well as the relay 2FP releases.

As soon as the code oscillators are set into operation, the driven code transmitter relay 2CP is operated at the 75 code rate by a circuit readily traced through the contacts 75CT of the 75 code oscillator and back contact 50 of the home relay 2H. This provides a caution driven code in the block A to energize the home relay 1H, as indicated in Fig. 2B.

In the case of the first signal 1 at an entrance point of the stretch, the apparatus for providing an inverse code in the block A is preferably omitted; and consequently after cessation of the steady energy in this block for causing the relay 2FP to release, followed in time by the release of the relay 2BP, the transmitter relay 2RCP for the next block B in advance is deenergized to change the steady energization in this block to zero. This energizes the back contact repeater relay 3BP at the end of the block B, and starts the code oscillators to transmit a caution code in this block, as indicated in the diagram of Fig. 2B.

The transmission of a caution driven code in the block B is immediately accompanied by inverse code pulses in this block. Referring to the signal location 2 in Fig. 1A, an inverse code operating circuit for the transmitter relay 2RCP is established under normal conditions, so that the first pulse of driven code is followed by an inverse code pulse. This inverse code operating circuit may be traced from (+), through back contact 24 of the code following track relay 2TR, front contact 25 of its repeater relay 2TP, back contact 52 of series repeater relay 2SRP, front contact 53 of the slow release relay 2HP, winding of relay 2RCP, to (—).

Thus, quickly following the energization of the back contact repeater relay 3BP, a driven code and an inverse code is established in the block B to operate the inverse code responsive relay 3RTR and reenergize the front contact repeater relay 3FP, with a suitable time margin before the relay 3BP releases to deenergize the track rails in the next block C in advance. Stated another way, there is a pause or hesitation, measured by the release time of the relays 3FP and 3BP in succession, between the removal of steady energy in the block B and the removal of steady energy in the next block C in advance, during which a driven and inverse code may be established in the block B to maintain such steady energization of the block C ahead.

The caution 75 driven code thus established in the block B, and the resultant energization of the home relay 2H closes its front contact 50 to connect the transmitter relay 2CP to the contacts 120CT of the 120 code oscillator, thereby increasing the code rate from 75 to 120 in the block A in the rear to energize the distant relay 1D and cause signal 1 to display a clear indication, assuming of course the block B is not then occupied and such indication is proper.

Figures 2D, 2E, 2F, 2G:
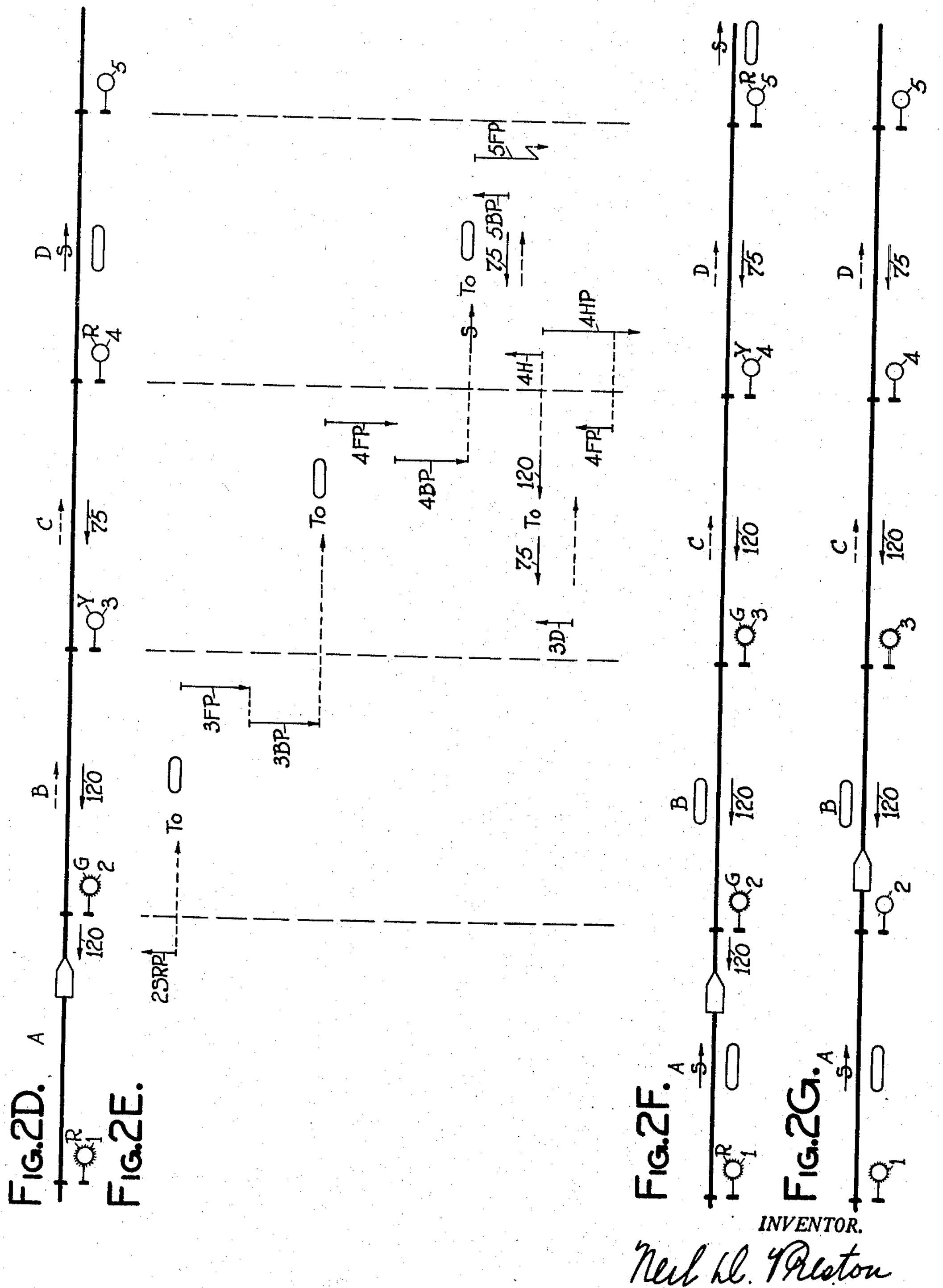

Such a clear indication for the signal 1 would permit a train to proceed at speed past the signal in the block A; but in that event the next signal 2 would be indicating caution, and the engineman of the train would be able to observe a change in the indication of this signal 2 ahead from caution to clear, as the approach starting control is extended in a manner later explained. It is considered that it is objectionable to display a caution or restrictive indication of the next signal ahead of a train, when traffic conditions do not require such an indication; and it is proposed in accordance with this invention to provide such approach starting control that this condition does not exist. In other words, the system is organized so that the approach starting control is extended, traffic conditions permitting, until there are two clear signals ahead of a train, as indicated in the diagrams of Figs. 2C and 2E. This condition is true for train movement through the stretch, as later explained, and also applies to the control of the signals 1 and 2 at the entrance point to the stretch.

Considering how the approach starting control is extended to obtain this result in connection with signal 2, the energization of the home relay 2H at signal 2 by the caution driven code in the block B opens its back contact 37 to start timing of the slow release relay 2HP. The release of this relay 2HP opens at its front contact 53 the circuit then providing inverse code in the block B, and since there is no inverse code in the block A in the rear, the transmission of inverse code in block B is changed to zero, as indicated in the diagram of Fig. 2B. Such cessation of inverse code releases the front contact repeater relay 3FP at the signal 3, and in turn the back contact repeater relay 3BP, due to the opening of the front contact $17^1$ of relay 3FP, to open the front contacts $40^1$ and $47^1$ of both of these relays, thereby deenergizing the relay 3RCP to discontinue the steady energization of the block C ahead.

The deenergization of the block C causes energization of the relay 4BP at the signal 4, starting of the code oscillators, and transmission of a caution driven code in this block C, accompanied by an inverse code in this block, in the same manner previously described for block B. The energization of the home relay 3H at the signal 3 performs two functions. It changes the code rate from 75 to 120 in the block B in the rear, and also at the same time initiates timing of the associated slow release relay 3HP. The change in the code rate in block B from the caution 75 code to the highest 120 clear code, energizes the distant relay 2D at signal 2; and referring to Fig. 1A, the energization of this relay 2D and the closure of its front contact 54 establishes an inverse code operating circuit for the transmitter relay 2RCP through this front contact 54 and the back contact 53 of the relay 2HP. Thus, after a relatively short time, inverse code is reestablished in the block B to restore the front contact repeater relay 3FP at signal 3, thereby closing its front contact $55^1$ which prepares an operating circuit for the inverse code transmitter relay 3RCP to be closed upon release of the timing relay 3HP, so that the inverse code in the block C, immediately existing when coding was first started in this block, is maintained after release of relay 3HP by the existence of inverse code in the block B in the rear.

The inverse code operating circuit for the transmitter relay 3RCP established under conditions just mentioned may be readily traced from (+), through back contact $24^1$ of track relay 3TR, front contact $25^1$ of its repeater relay 3TP, back contact $52^1$ of series repeater relay 3SRP, front contact $55^1$ of relay 3FP, back contact $53^1$ of relay 3HP, and winding of relay 3RCP, to (−).

In this manner just explained, and illustrated in the diagram of Fig. 2B, the normal inactive track circuits for the three blocks A, B and C at the entrance point to the stretch are changed automatically from the condition of steady energization shown in Fig. 2A to the condition of coding and indications of signals illustrated in Fig. 2C.

An operation of the system, similar to that just described for starting coding of operation for the appropriate number of blocks ahead in the case of operation of a start relay STR at an entrance point to the equipped territory, will occur with respect to any block which a train may happen to enter. It can be seen that the entrance of a train into a given block will deenergize that block the same as operation of the start relay STR, and that the same sequence of tumble-down control and build-up of driven code will occur for blocks ahead in the same manner, with the exception that no inverse code and timing relay such as 2HP is provided for the signal 1 in the case of an entrance point. Consequently, there would be a short time delay in transferring the tumble-down control from the first block to the second block, in the case of the entrance of a train into some block of the stretch, as compared with the operation above described and indicated in the diagram of Fig. 2B.

*Extending the approach starting control ahead of a train.*—As previously stated, it is considered desirable to extend the approach starting control to give a clear signal, traffic conditions permitting, before a train passes the next signal in the rear. This is accomplished by cutting off the inverse code in the next block ahead, when a train in a block reaches a point near its exit end where the associated series relay SR is energized.

Considering this operation in detail, and referring to the diagram of Fig. 2D, when the train passes the signal 1 and enters the block A, coding operation of the track relay 2RTR at the exit end of this block stops; and consequently its front contact repeater relay 2FP releases and closes its back contact 58 prior to the ultimate release of the back contact repeater relay 2BP and opening of its front contact 45, so as to maintain a supply of current to the code oscillators and coding contacts for continuing the transmission of driven code pulses toward this train. Such driven code pulses ahead of the train not only enable the energization of the associated series relay 2SR, but also provide coded rail current, which may be employed for governing cab signal or train control equipment, if so desired. Assume that the train in block A has advanced to a point, say 2000 feet from the exit end of this block, where the wheel shunt of this train provides sufficient current throuhg the series relay 2SR to attract its armature, and close its front contact 14 to energize its repeater relay 2SRP. The energization of the series repeater relay 2SRP opens at its back contact 52 the circuit then existing for providing inverse code in the next block B ahead; and this initiates a tumble-down of the inverse code to initiate the coding operation in the remote block D.

Considering the sequence of relay operation involved in this extension of approach starting control, as indicated in the diagram of Fig. 2E, the change from inverse code to zero in the block B releases the relay 3FP and in turn relay 3BP at the signal location 2. The opening of the front contact $55^1$ of relay 3FP, corresponding with the front contact 55 of relay 2FP for signal location 2, acts to open an inverse code operating circuit for signal location 3 to change the inverse code in block C to zero. This releases relays 4FP and 4BP at signal location 4; and the opening of the front contacts $40^2$, $47^2$ of these relays, corresponding with the front contacts 40, 47 of relays 2FP and 2BP at signal location 2 in Fig. 1A, deenergizes the inverse code transmitter 4RCP and causes steady energization of block D ahead to change to zero. This initiates transmission of a 75 driven code in the block D, accompanied by an inverse code, in the same way previously described. The resultant energization of the home relay 4H at signal location 4 changes the code rate from 75 to 120 in the block C, and energizes the distant relay 3D to close its front contact $54^1$, corresponding with the front contact 54 of relay 2D in Fig. 1A. The inverse code is thus reestablished in the block C, energizing relay 4FP at signal location 4 to close its front contact $55^2$ and provide inverse code in the block D at the time the relay 4HP ultimately releases, in substantially the same manner previously described in connection with setting up codes in blocks B and C at an entrance point.

In this way, as the train in block A approaches the signal 2, and before it passes this signal, the coding conditions and signal indications illustrated in the diagram of Fig. 2D are changed to those shown in the diagram of Fig. 2F, by initiating coding operation in an additional remote block D. The same operation will occur as the train progresses through the stretch and energizes a series relay SR in approaching each signal in turn.

*Automatic restoration to normal.*—Referring to the diagram of Fig. 2F, and assuming that it is not necessary to clear signal 1 for a following train, the start relay STR in Fig. 1A is energized to energize the transmitter relay 1RCP and apply steady energy to the entrance end of the block A behind the train. When the train in block A leaves this block, the steady energy in this block picks up track relay 2RTR and its front contact repeater 2FP, thereby opening at the back contact 58 of this repeater relay 2FP the circuit then supplying energy to the code oscillators and the driven code transmitter relay 2CP. Consequently, the track circuit of the block A is restored to its normal steadily energized condition behind the train, as indicated in the diagram of Fig. 2G.

This same operation is repeated as the train progresses and passes out of the successive blocks B, C, etc. It can be seen that this restoration to normal is dependent upon application of steady energy to the successive track circuits, starting with the entrance end; and there are certain characteristics in connection with this operation that should perhaps be explained. In practical operation, a coded track circuit under exceptional circumstances may be out of order for some reason and fail to provide a sustained energization at its entrance end to act in turn to apply steady energy to the next track circuit ahead. Under these special conditions, the defective track circuit acts the same as one that is occupied by a train to maintain the approach starting control in effect and maintain coding in a plurality of blocks ahead, after a train has passed through these blocks. The inverse code in the remote block of those thus maintained in coding operation by a defective track circuit, however, acts to energize the associated relays, such as 2FP and 2BP, to apply steady energy to the next block ahead, thereby automatically restoring to its normal inactive condition the coded track circuit of this next block ahead, and in turn all other blocks ahead as a train passes through them.

*Following trains.*—Considering now the situation where two trains may be following one another through the equipped stretch, it can be seen that the approach starting control operation initiated by the following train will establish coding operation for the appropriate number of blocks ahead of such train. The inverse code existing in the last block of such approach control limits, such as the block C in the diagram of Fig. 2D, maintains the next block D ahead steadily energized, and all other blocks ahead of that block D up to the one occupied by the forward train. If the trains should come close together, the following train receives the proper signal indications in accordance with its proximity to the train ahead, always maintaining in effect its approach starting control. Consequently, if the trains should thereafter move farther apart, the approach starting control exercised by the following train will provide coding in a sufficient number of blocks ahead to give a clear high speed indication for the following train.

If it should be necessary for some reason for a train to enter the block occupied by another train ahead, after observing the stop indication of the signal at the entrance to such block in accordance with the rules of the railroad with regard to permissive stop signals, coding operation will be automatically initiated ahead of the following train for the appropriate number of blocks, if the trains should thereafter separate.

*Other operating features.*—The desired approach lighting of the signals is readily obtained by including in the lighting circuit a back contact 49 of the front contact repeater relay 2FP of the inverse code track relay 2RTR, as shown in Fig. 1A. Since the track relays, such as 2RTR, are normally energized, the signals are not lighted. During the approach control operation, a signal may be temporarily lighted by the release of its associated front contact repeater relay, such as 2FP; but after the approach starting control operation has been completed and inverse codes have been established, as shown in the diagram of Fig. 2F, the approach lighting of the signals is limited to the next two signals 2 and 3 ahead of the train. When the train in diagram of Fig. 2F passes into the block B, and until it reaches the point where the series repeater relay 3SRP for signal location 3 is energized, only one signal 3 ahead of the train is lighted. Regardless of these detailed differences in the number of signals lighted at different times, the system satisfies the purpose of approach lighting in saving lighting energy for the signals when not needed.

Another optional feature of this system involves reducing the energy level of track rail energization when the track circuits are normally energized. This is accomplished by including a regulating resistance 22 in series with the track battery at the entrance end to each block, as illustrated in Fig. 1A for the typical signal location 2, and by providing a shunt for this resistance closed by front contact 60 of the repeater relay 2BP. Under the normal conditions shown, this resistance 22 limits the current supplied to the track circuit to that required for maintaining the code following track relay steadily energized; but under the conditions where an inverse code is to be transmitted, i. e. when the relay 2BP is energized, this resistance is shunted by contact 60 and obvious circuit connections to increase the track circuit current to the value suitable for operating an inverse code following track relay by current pulses. This expedient is desirable, because under many operating conditions for coded track circuits, the current required for operation of a code following relay by pulses of relatively short duration is substantially greater than that required for a sustained steady energization of the track relay; and this regulation of the energy level of track circuit exercitation for the different conditions tends to afford a substantial saving in energy, which is particularly useful when primary batteries are used.

*Modification for multiple block indications.*—The approach starting system of this invention for normally inactive and steadily energized coded track circuits may be readily adapted by a change in the operating time of certain parts, such as the relay 2HP, to provide for the control of block signal indications by three different code rates, such as 75, 120 and 180, and thereby obtain so called multiple block indications used on some railroads. Fig. 3 illustrates for one typical signal location a modification of the system for providing a typical form of such multiple block indications.

This modification of Fig. 3 involves the addition of another code oscillator 180—OSC and associated coding contacts 180CT, and an additional decoder unit adjusted for this code rate to energize a relay 6XD responsive to such additional 180 code rate. The home relay 6H, responsive to any code rate, the distant relay 6D energized for the 120 code rate, and the additional relay 6XD energized for the 180 code rate, serve to govern the associated block signal to provide the desired multiple block indications, in accordance with established practice. In the simplified arrangement illustrated, it is assumed that the multiple block indications for the signal 6 will be provided by two color light signal units 6*a* and 6*b*, which are controlled to provide typical multiple block indications, such as green over green, yellow over red, yellow over yellow, and red over red. Fig. 3 shows one simple arrangement of circuits for energizing the individual green, yellow and red lamps of the two signal units 6*a* and 6*b* in accordance with the energization of the code responsive relays 6H, 6D and 6XD, to provide these typical multiple block indications, in a manner that can be readily understood from the illustration of the circuits and without detailed explanation. The control circuits for the driven code transmitter relay 6CP are also arranged, as shown in Fig. 3, to be governed by front and back contacts 62 and 63 of the relays 6XD and 6D, as well as the contact $50^4$ of the home relay 6H, so that the highest 180 code rate is transmitted in a block next in the rear of a block supplied by driven code at either the 120 or 180 code rate.

In this modification of Fig. 3, the transmission of inverse code in blocks ahead to arrest the tumble-down starting control is initiated for a block when the highest 180 code is received, in accordance with the same operating principles characterizing the embodiment of the invention illustrated in Figs. 1A and 1B. In other words, the function of contact 54 of the relay 2D in the inverse code operating circuit for signal location 2 in Fig. 1A is performed in the modification of Fig. 3 by a front contact 64 of the relay 6XD, which is energized only by the highest 180 code rate. When three code rates are involved, it can be seen that the highest 180 code rate does not exist in a given block until code rates of 120 and 75 exist in two blocks ahead. Consequently, an inverse code is not established in a block next in the rear of a block that has just started its coding operation, until the code rate has been increased from 75 to 120, and from a 120 to a 180, in two blocks in the rear. In order to span the time interval required for such increase in code rate and building up of inverse code in two blocks, the release time of the repeater relay such as 2HP for the home relay 2H in Fig. 1A may be increased; or, as shown in Fig. 3, another slow release repeater relay 6HPP may be energized through a front contact 65 of the relay 6HP, by an obvious circuit, so that upon energization of the relay 6H, the relays 6HP and 6HPP are deenergized in succession to approximately double the time interval for opening the front contact 66 of relay 6HPP. This front contact 66 of relay 6HPP is included in the inverse code operating circuit, and corresponds in its function with the front contact 53 of relay 2HP. Such increase in the time interval for providing inverse code in a block just started into coding operation, before such inverse code is made dependent upon the reception of an inverse code from the rear, serves to provide sufficient time with a suitable margin for increasing the code rate and establishing inverse code in two blocks, as required for a multiple block indication organization using three different code rates.

Except for the provision of this additional time delay, as just described, and other detail variations due to the use of additional coding equipment, this modification of Fig. 3 operates generally in the same manner as previously described in detail for the embodiment of the invention shown in Figs. 1A and 1B; and such operation can be readily understood without detailed explanation or diagrams.

From the foregoing illustration and description of typical apparatus and circuit organizations embodying the invention, it can be seen that I have provided an automatic approach starting arrangement for normally inactive and steadily energized coded track circuits of the automatic block signalling system for multiple track railroads, which utilizes conventional apparatus to obtain the desired results in a simple and effective manner, with a limited number of additional relays and circuit connections not otherwise required for a constantly operating system with inverse codes for approach lighting.

The particular organizations and arrangements of apparatus and circuits shown and described are merely illustrative or typical embodiments of the invention; and it should be understood that various modifications, adaptations, and additions may be made in the specific structures shown and described, without departing from the invention.

What I claim is:

1. An automatic block signal system for a stretch of track having blocks and signalled for train movement in one direction only comprising in combination, a normally inactive code track circuit for each block operable when set into operation to provide signal control driven codes of a selected code rate toward the entrance end of the block and at times inverse code in the opposite direction, means responsive to the cessation of an inverse code in a given block for automatically initiating coding operation of the track circuit of the next block in advance, inverse code control means for transmitting inverse code in a block only if a driven code of the highest code rate is being received or an inverse code exists in the next block in the rear, and means for providing an inverse code for a limited time only in a block having its coding operation just initiated independently of the associated inverse control means, whereby an inverse code is maintained in a block having its coding operation just started until there is time for an increase in the code rate in a block in the rear to establish an inverse code in that block.

2. In an automatic block signal system for multiple track railroads comprising, a normally inactive coded track circuit for each of a series of consecutive blocks operable when set into coding operation to provide a signal control driven code of a selected code rate in one direction and at times an inverse code in the opposite direction, slow acting means for maintaining each block steadily energized at its entrance end only if the next block in the rear is steadily or intermittently energized from its entrance end, said slow acting means acting to maintain steady energization of its associated block for a limited time following deenergization of the next block in the rear, an inverse code control circuit for each coded track circuit effective only if either a driven code of the highest code rate is being received or inverse code exists in the next block in the rear, and means for providing inverse code in a block for a limited time after coding operation thereof has been started independently of said associated inverse code control circuit.

3. In an automatic block signal system of the character described, a stretch of track divided into a series of blocks each having a signal at the entrance end governing train movement in the same direction, a normally inactive coded track circuit for each block including a transmitter relay and a track relay at each end for providing driven and inverse codes, means for the exit end of each block responsive to a sustained deenergization or an intermittent energization of that block from its entrance end for causing coding operation in that block, means for each block effective until coding operation in that block has been started for energizing the transmitter relay at its entrance end to provide a steady energization thereof provided the track relay for the exit end of the next block in the rear is intermittently or steadily energized, means for providing an inverse code in each block only if a driven code of the highest code rate is being received or inverse code exists in the next block in the rear, and means normally effective for providing inverse code in each block for a time subsequent to the initiation of coding operation in that block independently of the existence of an inverse code in the next block in the rear.

4. In an automatic block signal system for multiple track railroads signalled for train movement in one direction only, a coded track circuit for each of a series of consecutive blocks including code transmitting means and code receiving means for each end of the block, circuit means for operating the code transmitting means for the entrance end of a block to provide inverse code pulses during the off intervals of a driven code being received, inverse code receiving means at the exit end of each block responsive to the reception of inverse code in that block, and means acting after a time interval of delay upon the reception of driven code pulses of any code rate at the entrance end of a block for making the operation of the associated code transmitting means for transmission of inverse code pulses dependent upon the condition of said inverse code receiving means for the exit end of the next block in the rear.

5. A normally inactive coded track circuit automatic block signalling system for multiple track railroads comprising, a normally inactive coded track circuit for each block including code transmitting and receiving means at both ends of the block for transmitting and receiving signal control driven and inverse codes, a code responsive relay for the entrance end of each block energized by a signal control driven code of any code rate, an inverse code operating circuit for each block normally established while that block is inactive, means for opening said inverse code operating circuit upon energization of the associated code responsive relay after a limited time, and means responsive to the reception of an inverse code in a block for providing inverse code in the next block ahead independently of its associated inverse code operating circuit.

6. In a coded track circuit automatic block signalling system of the character described for a series of consecutive blocks, a normally inactive coded track circuit for each block operable to provide inverse code pulses during the off intervals between driven code pulses being received, control means for permitting transmission of inverse code pulses in a block only if driven code pulses of the highest code rate are being received or there is inverse code in the next block in the rear, a code responsive relay for the entrance end of each block energized by the reception of driven code pulses at any code rate, and means for rendering the transmission of inverse code in each block dependent upon the associated control means after a time interval following the energization of said code responsive relay of that block, thereby allowing time for an increase in the code rate and transmission of an inverse code in a block in the rear due to such increase in code rate.

7. In a coded track circuit automatic block signalling system of the type described, a normally inactive coded track circuit for each of a series of consecutive blocks, a transmitter relay and a track relay for each end of a block and associated apparatus operable to provide a signal control driven code of a selected code rate and an inverse code, a code responsive relay for the entrance end of each block energized by the coding operation of the associated track relay at any code rate, a slow acting repeater relay governed by said code responsive relay, control circuits for rendering the transmitter relay at the entrance end of each block effective to transmit inverse code pulses during the off intervals of a driven code being received, one of said control circuits including contacts of the associated repeater relay closed only while its code responsive relay is deenergized, the other control circuit being closed only if a driven code of the highest code rate is being received or an inverse code exists in the next block in the rear.

8. A coded track circuit system of block signalling including a normally inactive coded track circuit for each of a series of consecutive blocks, each of said track circuits having code transmitting and receiving means at each end operable to provide signal control driven code of a selected code rate in one direction and also an intermittent energization by an inverse code of a fixed polarity in the opposite direction, said code transmitting means for the exit end of each block including normally deenergized electrically operable code oscillators for intermittently closing coding contacts at different code rates, and means governed by the code receiving means for the exit end of each block for energizing the associated code oscillators and coding contacts in response to the intermittent energization of that block from its entrance end and also a sustained deenergization thereof.

9. A normally inactive coded track circuit block signalling system for multiple track railroads comprising in combination, a coded track circuit for each block including a transmitter relay at the entrance end acting when energized to supply current to the track rails of that block, a track relay for the exit end of each block, a slow release front contact repeater relay energized while said track relay is energized, a back contact repeater relay energized while said track relay is deenergized and said front contact repeater relay is also energized, and a circuit for energizing the transmitter relay of a given block to maintain steady energization thereof until coding operation is started, said circuit being established if a front contact of either of said repeater relays is closed.

10. An automatic block signal system for multiple track railroads comprising, a normally inactive and steadily energized coded track circuit for each of a series of consecutive blocks, each coded track circuit including a transmitter relay and a track relay for each end of the block and associated apparatus operable to provide a signal control driven code of a selected code rate in one direction and at times an inverse code in the opposite direction, code starting means for the exit end of each block actuated by a sustained deenergization or by intermittent energization of the associated track relay for causing coding operation in that block, control means actuated by the steady or intermittent energization of the track relay for the exit end of a given block for maintaining the next block in advance steadily energized, said code starting and said control means for the several blocks cooperating to provide a tumble-down control for starting coding operation in successive blocks ahead of a train until arrested by transmission of an inverse code in the remote block, means for providing an inverse code for a limited time in each block having its coding operation just started, and means for each block operated only by the reception of the highest code rate for causing transmission of inverse codes in blocks ahead to arrest said tumble-down control.

11. A coded track circuit automatic block signalling system for multiple track railroads comprising, a normally inactive steadily energized coded track circuit for each of a series of blocks, each track circuit including code transmitting means and receiving means for each end of the block operable to provide a driven code of any one of three different selected code rates in one direction and at times an inverse code in the opposite direction, and approach starting means including interconnecting control circuits for the code transmitting and receiving means of adjacent blocks and cooperating by a tumble-down deenergization of successive blocks for automatically starting coding operation in a plurality of successive blocks ahead of the train until an inverse code is transmitted in the remote block, said approach starting means including means for providing an inverse code in each block for a limited time only after coding operation has just been started in that block and for thereafter transmitting such inverse code only if the highest code rate is being received in a block ahead of the train.

NEIL D. PRESTON.

No references cited.